INVENTOR.
JIMMY R. COLE
BY
William J. Miller
ATTORNEY

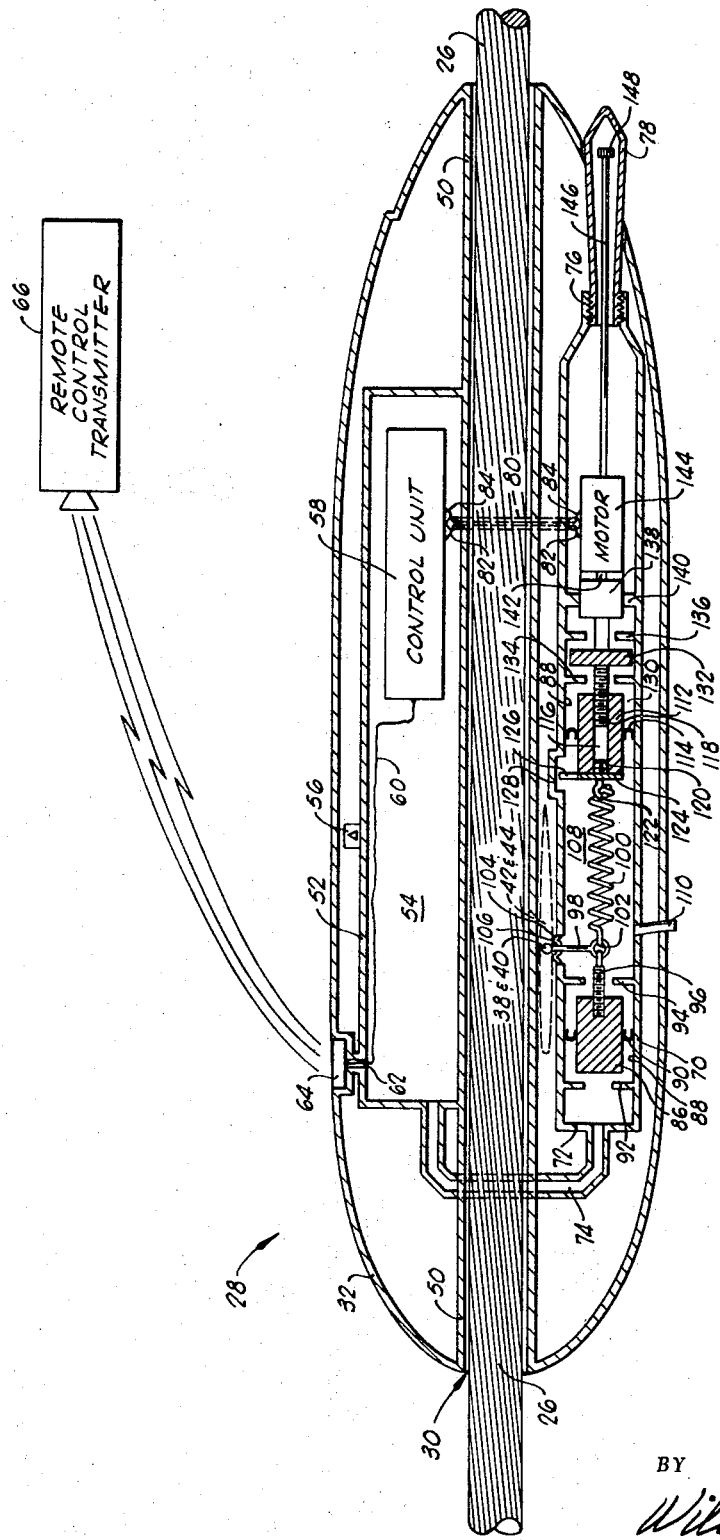

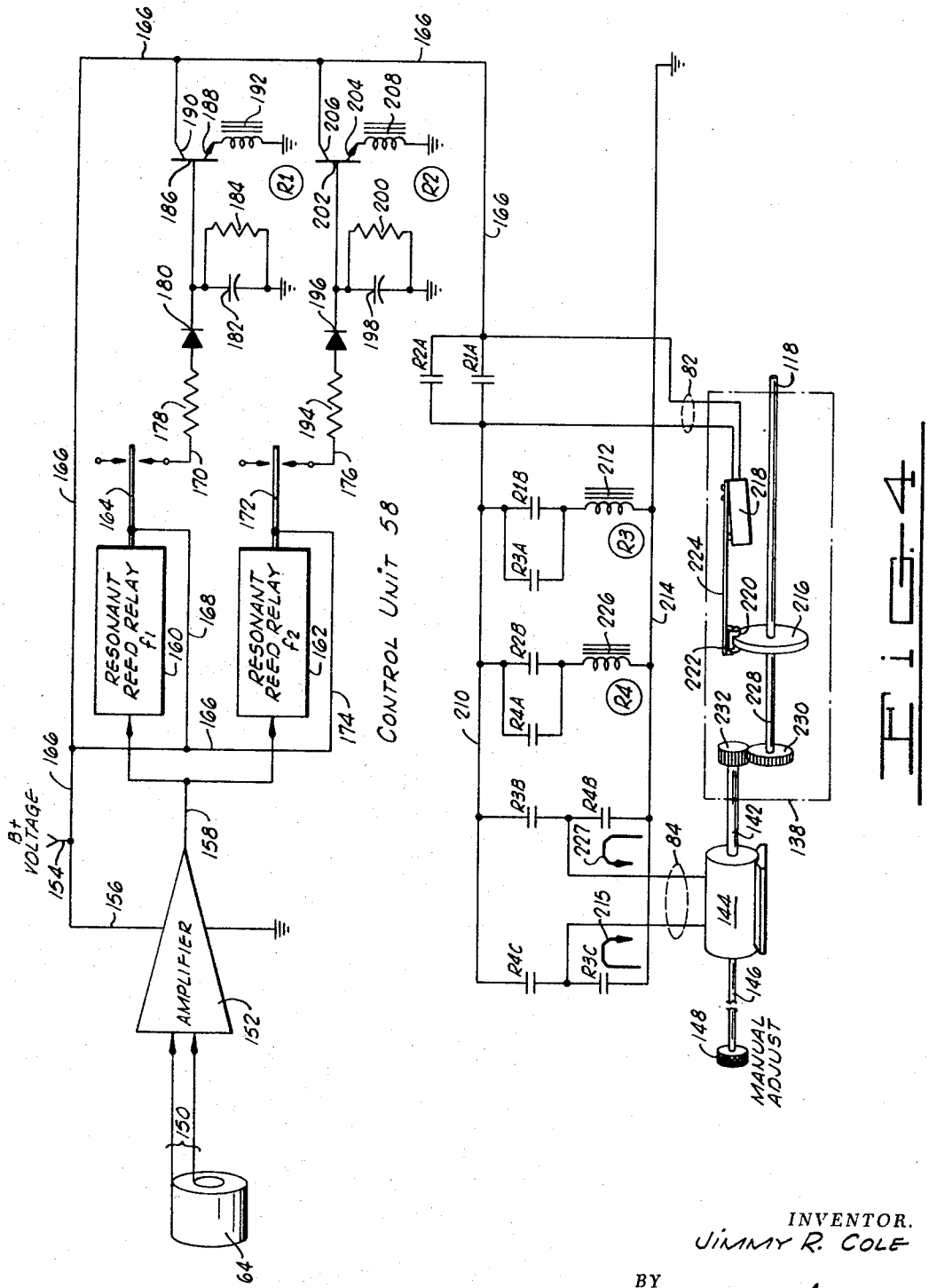

United States Patent Office 3,434,446
Patented Mar. 25, 1969

3,434,446
REMOTELY CONTROLLABLE PRESSURE
RESPONSIVE APPARATUS
Jimmy R. Cole, Ponca City, Okla., assignor to Continental Oil Company, Ponca City, Okla., a corporation of Delaware
Filed Oct. 2, 1967, Ser. No. 672,341
Int. Cl. B63b 21/56, 17/00
U.S. Cl. 114—235      6 Claims

ABSTRACT OF THE DISCLOSURE

Apparatus for effecting depth keeping of a marine paravane wherein depth control is attained by utilizing the differential force resulting from water pressure acting upon a moveable diaphragm against the restoring force of a spring acting on the diaphragm, the differential force being transmitted to an actuating linkage which is connected such that proportional movement is applied to depth adjusting structure. The diaphragm member is positioned by spring tension which can be varied in response to acoustic or other type of energy transmission from a ship or surface station and the spring tension adjustment effectively selects the paravane operating depth.

Cross reference to related applications

This invention is particularly suited for use in a paravane of the type used on a marine seismic cable, such paravane teachings being particular subject matter of the co-pending application of Jimmy Ray Cole and Paul L. Buller entitled, "Seismic Cable Depth Control Apparatus," Patent No. 3,375,800, issued Apr. 7, 1967, and assigned to the present assignee. Another closely related application is that of William L. Chapman entitled "Compressed Air, Pressure-Sensing Actuator," Ser. No. 635,861, filed on May 3, 1967, and assigned to the present assignee.

Background of the invention

*Field of the invention.*—The invention relates generally to pressure-responsive actuating devices and, more particularly, but not by way of limitation, it relates to an improved actuation device for adjusting the operating depth of a paravane, the actuation device being controllable from a remote or surface station.

*Description of the prior art.*—The prior art includes teachings directed to various types of paravanes which have adjustable diving plane or planes and which provide additional facility to enable operation at a predetermined depth when towed through water. It is known to provide mechanism for assessing the depth of operation of a paravane and to attempt to provide for automatic plane adjustment in response to such continuous depth assessment. Various depth control devices of varied effectiveness are known, but none of the prior art devices supply the degree of reliability and accuracy which is found to be necessary in the marine seismic prospecting art.

Summary of the invention

The present invention contemplates a depth keeping paravane having pressure responsive depth control mechanism which is remotely actuatable from a surface control station. In a more limited aspect, the invention consists of a first enclosure containing air at atmospheric pressure and a second enclosure receiving water therein at ambient pressure, both of the enclosures being contained within the paravane. The first and second enclosures are joined through a common wall or pressure differential unit consisting of a piston member which is biased under spring tension within said water pressure enclosure. The spring tension is made variable in response to remotely actuated control mechanism also contained within the paravane which serves to increase or decrease the spring tension and this in turn, changes the operating depth of the paravane.

Therefore, it is an object of the present invention to provide paravane depth control apparatus which is of simple construction but which is very reliable in operation.

It is also an object of this invention to provide a paravane for seismic cable depth control whose depth can be changed from a remote position.

It is a further object of the present invention to provide seismic cable depth control apparatus wherein the operating depth of multiple controllers can be adjusted either individually or as a group from a remote surface station.

Finally, it is an object of the present invention to provide a seismic cable depth control paravane which is remotely controllable via energy transmission through a wireless linkage.

Other objects and advantages of the invention will be evident from the following detailed description when read in conjunction with the accompanying drawings which illustrate the invention.

Brief description of the drawings

FIG. 3 is a vertical section of a paravane with parts shown in dotted outline and including the depth keeping mechanism in generally schematic form; and FIG. 4 is a partial schematic diagram of the depth control system of the present invention.

Description of the preferred embodiment

Figure 1:
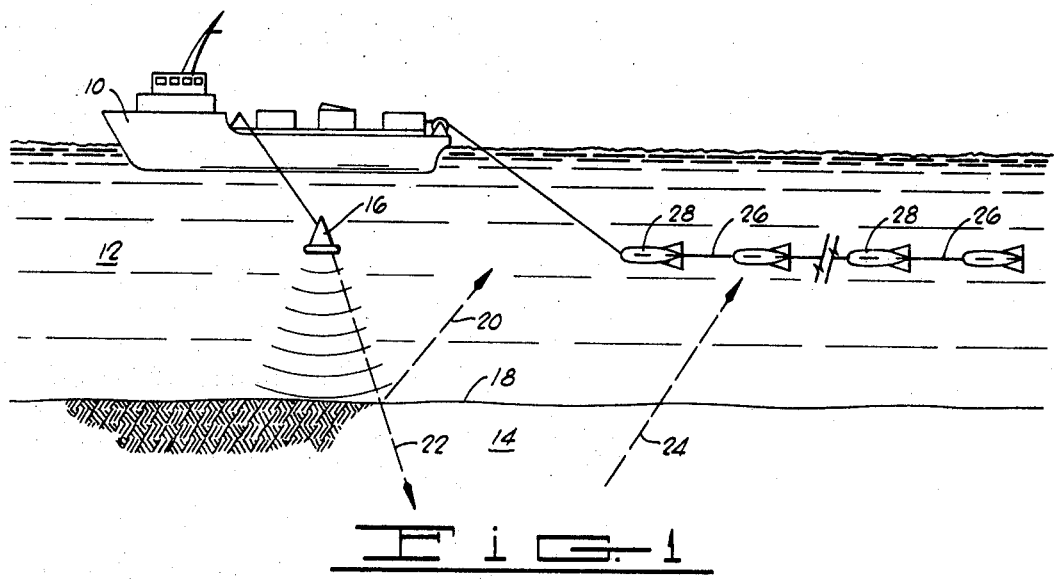
FIG. 1 is a pictorial view showing a one-ship marine seismic sounding rig.

FIG. 1 depicts a one-ship seismic surveying rig, so-called because both the seismic energy generation and detection take place from or appendant to the same ship. Thus, the survey vessel 10 is a float on a body of water 12 over the earth 14 and its underlying substrata which are the subject of seismic survey. The vessel 10 supports a seismic source 16, here shown as a vibrator of known type, within water body 12 to emit acoustic energy vibration which travels through the water and earth-water interface 18 to proceed on downward through the earth 14 as seismic energy. Thus, some acoustic energy reverberates within the water layer as depicted generally by dashed arrow 20, but the majority of the energy proceeds on downward (shown generally as dashed arrow 22) as seismic energy to be reflected from interfaces deep within the earth.

The reflected seismic energy depicted by dash line 24 can then be detected in the water body 12 by means of a seismic detector cable 26. Seismic detector cable 26 may be a conventional form of cable or streamer wherein a plurality of geophones (not shown) are spaced therealong to receive reflected seismic energy indications. In order to insure very accurate recording of the seismic energy return, it is desirable to maintain the seismic cable 26 at a predetermined depth with as little variation as possible; hence, a series of paravanes 28 are employed to keep seismic cable 26 at a predetermined depth along its entire length. Such paravanes as might be employed for paravanes 28 are disclosed in various forms in the aforementioned patent application, Ser. No. 604,874.

Figure 2:
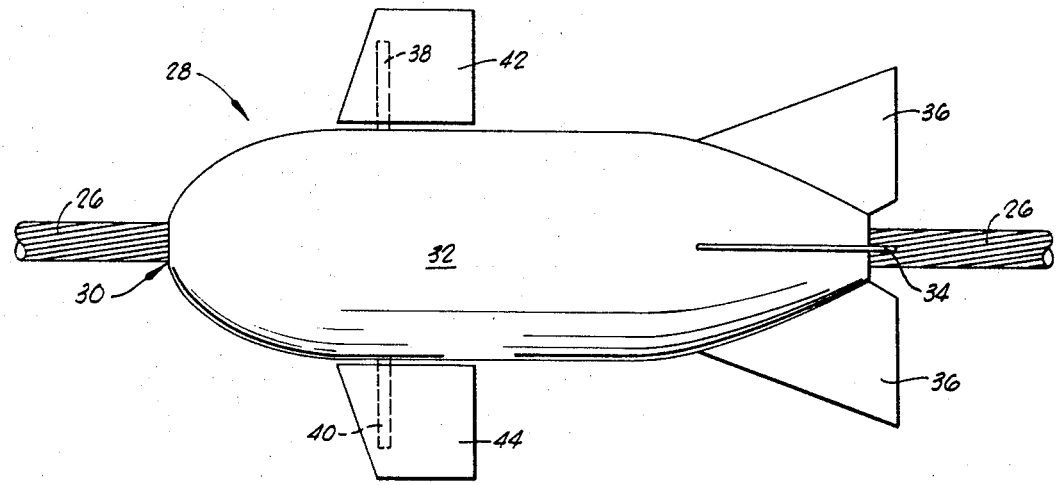
FIG. 2 is a top view of one form of seismic cable paravane which may employ the present invention.

FIG. 2 shows one form of paravane 28 which is rotatably secured about a seismic detector cable 26 by receiving cable 26 through an inner tubular wall 30 which is formed as an axial bore through the length of paravane 28. Paravane 28 consists of an elongated housing 32 which may be filled with floatation material, voided air space or such. Paravane 28 is fitted with vertical fixed stabilizers 34 and horizontal fixed stabilizers 36 arranged in quadrature about the after end of housing 32, and a pair of horizontally disposed planing control shafts 38 and 40 extend on opposite sides of elongated housing 32. The shafts 38 and 40 are conencted to respective diving planes 42 and 44 and impart rotational planing control thereto in a manner to be further described below.

Referring now to FIG. 3, an elongated housing 32 (of the exemplary paravane 28) is shown in schematic section. Thus, the elongated housing 32 is shown with its axial bore 30, formed by an inner tubular wall 50, receiving the seismic detector cable 26 therethrough. The paravane 28 is secured at a predetermined point along detector cable 26 by structure which is not specifically shown; however, it may be rotatably secured such that the cable can rotate inside the paravane without causing the paravane itself to rotate. It is necessary that the paravanes 28 mintain a normal attitude, i.e., keeping the axis of the diving planes horizontal or parallel to the surface of the water.

The housing 32 contains a first enclosure or air-tight tank 52 which defines an air space 54. The air tank 52 contains a suitable passage or valve 56 through one wall thereof to provide access for check and adjustment of pressure within air space 54. A control unit enclosure 58, including the control electronics etc .as will be further described below, may be included within air space 54 as a space-saving measure. In this event, a control cable 60 is led out through an air-tight feedthrough fixture 62 to a selected type of signal energy detection device 64 which is suitably positioned to receive remotely generated signal energy from a remote control transmitter 66. One form of the invention utilizes supersonic energy and, in that case, the remote control transmitter 66 generates an acoustic signal output of preselected frequency and the detection device 64, e.g., a piezoelectric pressure sensitive detector, provides control input via cable 60 to control unit 58 as will be further described.

A second enclosure 70 provides a chamber wherein paravane control is achieved by a balance of forces from the spring and water pressure as will be described below. The chamber 70 may be formed, for example, as a cylinder having an end wall 72 which connects via air-tight tubing 74 to the air tank 52 and its other end is tapered to a threaded connection 76 for receiving a threaded end cover 78 in water-tight affixure. End cover 78 is removable to provide adjustment access as will be further described. A further air-tight passage or tubing 80 is provided between the air tank 52 and chamber 70 proximate the control unit 58 for conducting two electrical pairs cables 82 and 84 therethrough.

A first piston 86 shaped with a cross section similar but slightly smaller in area than the internal cross section of chamber 70 is position for movement therein and a rolling diaphragm seal 90 is disposed about piston 86 in contact with the internal wall 88. A suitable type of rolling diaphragm seal is commercially available from the Bellofram Corporation in Burlington, Mass. The rolling diaphragm seal 90 has the capability of allowing movement of piston 86 within innerbore 88 while maintaining a continual air-tight seal therebetween. The movement of piston 86 is limited by limit stops formed by respective stop rings 92 and 94 which are suitably secured about the innerbore 88 at spaced positions which allow optimum movement of piston 86.

The piston 86 is threadedly secured upon an eyebolt 96, the eye of which is movably affixed to a lever 98 and a tension spring 100. Thus, a pivotal connection about a point 102 provides mutually rotational connection between each of eyebolt 96, lever 98 and tension spring 100. The lever 98 extends up through a slot 104 for connection through the shafts 38 and 40 to impart both positive and negative planing rotation to respective diving planes 42 and 44. A pliable film or rubber material may be provided as a diaphragm 106 to prevent the entry of water from space 108 of chamber 70 into the housing 32. The enclosure 108 receives water therein at the ambient water pressure by means of exterior communication through a tube 110 leading outboard of enclosure 32.

The spring 100 is securely affixed to a second piston member 112. Piston member 112 is also designed to carry a rolling diaphragm seal 114 about its periphery in fluid-tight contact with innerbore 88 of chamber 70. Second piston member 112 is formed to have an axial threaded bore 116 through its center in which an adjustment screw 118 is movably positioned as will be further described. The other end of threaded bore 116 is sealed off by a threaded connector 120 which may be shaped to provide additional functions of spring securing and piston alignment. That is, the connector 120 may be formed to extend a hook portion 122 along its axis for the purpose of retaining tension spring 100 thereon, and a midportion may be formed as an outwardly flaring flange 124 having the general cross-sectional shape of second piston member 112 but extending a guide pin portion 126 outward thereof for slidable engagement within a groove 128 formed in the innerbore 88 of chamber 70. The slidable retention of pin portion 126 within elongated slot 128 serves to restrain any rotational movement of second piston member 112 during rotation of adjusting screw 118.

The rolling diaphragm seal 114 provides separation between the water-filled space 108 and the after interior 130 which is air-filled and communicates through duct 80 with air space 54. The air pressure in the total air space composed of air space 54, interior 130, etc., should not change appreciably as adjustments are made or when the unit is operating at some given depth. This is desirable so that only the spring 100 will be controlling the depth and sensitivity. A stop disk 132 is rigidly secured along adjustment shaft 118 to provide adjustment limits through contact with a pair of stops, forward and after limit rings 134 and 136, respectively, which are rigidly affixed about innerbore 88 at a selected spacing. The adjustment shaft 118 is led into a gear box 138, which is suitably secured by mounting members 140 within chamber 70, and an input shaft 142 receives rotational output from motor 144. An extension 146 of the motor shaft extends on rearward and supports a knurled knob 148 within the access cover 78 to provide manual adjustment as will be further described. Motor 144 may be powered by a suitable battery pack (not shown). Power requirements need not be excessive since motor energization is only required during remote "coarse" adjustment.

The remote control transmitter 66 (FIG. 3) may generate such as an acoustic signal within the water. The acoustic signal may be any one of selected frequencies and of very short duration to activate a tuned circuit response system. Thus, as shown in FIG. 4, a suitable detector 64, e.g., a piezoelectric acoustic energy transducer, detects a burst of acoustic energy and provides an output on leads 150 (cable 60) to a conventional form of amplifier 152. A positive voltage is supplied at input 154 and it is applied via lead 156 to energize amplifier 152. The amplified output signal is applied on lead 158 in parallel to respective resonant reed relays 160 and 162.

The resonant reed relays 160 and 162 are tuned relays which, when activated, provide vibrating contacts across which an intermittent DC output can be derived. Thus, resonant reed relay 160 is selected to be resonant in response to a predetermined frequency $F_1$ signal input such that the contact 164 will vibrate. The positive supply voltage from input 154 through leads 166 and 168 places voltage upon vibrating contact 164 such that an intermittent positive output of frequency $F_1$ is present on lead 170 with respect to the circuit ground or common. Similarly, in the event that a different frequency $F_2$ is detected and amplified in amplifier 152, the resonant reed relay 162 will cause vibration of contact 172 such that supply voltage on leads 166 and 174 will be intermittently conducted as voltage pulses at frequency $F_2$ on an input lead 176.

Voltage pulse input on lead 170 ($F_1$ response) is conducted through a current limiting resistor 178 and diode 180 to charge up a capacitor 182 as bypassed by a relatively high resistance 184. When the charge on capacitor 182 amounts to a predetermined voltage, an NPN-type transistor 186 is fired into conduction with current flow through emitter 188 and collector 190 to voltage supply lead 166 thereby energizing the $R_1$ relay 192.

Then $F_2$ frequency response energizing resonant reed relay 162 can be utilized to provide an alternative control function, in this case a reverse energization of the motor as will be further described. Thus, voltage pulse output at frequency $F_2$ on lead 176 is conducted through a current limiting resistor 194 and diode 196 to charge up a capacitor 198 as bypassed by a biasing resistance 200. When the voltage on capacitor 198 rises to a certain predetermined value, an NPN-type transistor 202 is caused to conduct with current flow through emitter 204 and collector 206 to energize an $R_2$ relay 208.

It can be noted that energization of either $R_1$ relay 192 or $R_2$ relay 208 closes a respective one of relay contacts $R_{1A}$ or $R_{2A}$ to place positive supply voltage from lead 166 on to the energizing lead 210, the motor control energizing voltage. In the case of energization of the $R_1$ relay 192, the $R_{1A}$ relay contact is closed to energize lead 210 and, similarly, the $R_{1B}$ relay contact is closed to provide continuity from supply lead 210 through an $R_3$ relay 212 to a ground lead 214 such that current flow through relay 212 causes energization thereof. Thus, relay contacts $R_{3A}$, $R_{3B}$ and $R_{3C}$ are simultaneously energized to provide current flow through the DC motor 144 to cause rotation in a first direction. To retrace, the $R_{1B}$ contact need only be momentary since closure of $R_3$ relay 212 assures that holding contact $R_{3A}$ will remain closed through the particular adjustment phase or depth correction actuation. Closure of relay contacts $R_{3B}$ and $R_{3C}$ provide current flow from ground lead 214 through DC motor 144 in the relative direction of arrow 215 and then to supply lead 210, and voltage supply lead 210 is assured of supply voltage energization even after release of $R_1$ relay 192 (thus, relay contacts $R_{1A}$) due to the action of a cam 216. Cam 216 is shaped to have a notch or cutout sector 220 formed therein such that a roller 222 supported along switch arm 224 actuates the normally open microswitch 218 in response to rotation of cam wheel 216. That is, when roller 222 is within the groove 220 the microswitch 218 is open in the energizaetion circuit to lead 210. Any energization of $R_1$ relay 192 or $R_2$ relay 208 (relay contacts $R_{1A}$ or $R_{2A}$) will momentarily start the motor 144 to move cam wheel 216 such that roller 222 is urged on to the outer circumferal race of cam wheel 216 thereby closing microswitch 218 to provide continued energization to lead 210 until the cam wheel 216 has made one complete revolution. It should be noted that the increment of adjustment can be varied by selection of the size of cam wheel 216.

The motor 144 can be energized in an opposite direction, i.e., opposite from that effected by $R_3$ relay 212, when the frequency $F_2$ response is received to energize transistor 202 and the $R_2$ relay 208. This effect closes contacts $R_{2A}$ and $R_{2B}$ to energize lead 210 through contact $R_{2B}$ to the $R_4$ relay 226. This, in turn, causes holding conduction through relay contact $R_{4A}$ and opposite motor energizatin in the direction of arrow 227 by conduction from ground lead 214 through relay contact $R_{4B}$ and motor 144 to contact $R_{4C}$ and the supply voltage lead 210.

The microswitch 218 and the associated cam wheel 216 may be included in the gear box 138 (FIG. 3) which also includes a selected gear train, e.g., the shaft 228, gear 230 and gear 232 that is connected to the motor drive shaft 142.

Operation

In the following section, it may be assumed that the depth keeping paravanes are employed in a one-ship rig similar to the seismic surveying system of FIG. 1 and it is further assumed that an acoustic energy form of signaling energy is employed to transmit the control functions from the ship 10. Thus, the remote control transmitter 66 (FIG. 3) may be a relatively small, directive acoustic energy source which can be manually keyed from shipboard and an acoustic energy detection device or piezoelectric crystal 64 is employed in the paravane or plural paravanes to pick up the control signal and initiate control functions within the body of the paravane. Also, in accordance with one form of control procedure, two different frequencies $F_1$ and $F_2$ of, for example, 200 cycles per second and 300 cycles per second may be utilized to convey "surface" and "dive" commands, respectively, to the paravanes.

Prior to placing the paravane 28 in the water certain manual adjustments can be made: The air pressure in air space 54 is adjusted to atmospheric and thus allowed to remain at that value. The volume of air at atmospheric pressure acts as a reference while spring 100 actually determines the depth and sensitivity of control.

The diving planes 42 and 44 are moved in proportion to a countering force which results as the first piston member 86 is moved in response to change of the ambient water pressure. That is, a movement resulting from imbalance of the force of the tension spring 100 versus the static water pressure present within water chamber 108. An additional manual adjustment can be made prior to entry into the water to set the "coarse" operating depth. That is, the water-tight access cover 78 can be screwed out to expose the knob 148 which can then be rotated to adjust shaft 146 through motor 144 and gear box 138 to rotate the threaded shaft 118 such that second piston member 112 is prepositioned along the chamber 70 to provide a predetermined tension to tthe tension spring 100 and, therefore, the restraining force on first piston member 86. This acts to preset the operating depth.

After setting each of the plurality of paravanes 28, the seismic detector cable can be trailed in the water and the plurality of paravanes 28 will insure that the detector cable will maintain the proper depth with very little variation. As previously stated, the force executed by spring 100 on piston 86 determines the operating depth of the paravane. The force resulting from ambient water pressure in space 108 and the force from tension spring 100 will tend to maintain diving planes 42 and 44 in an even horizontal plane when the paravane 28 is operating at its intended depth.

If for some reason the paravane 28 should dive, i.e., due to salinity change, temperature gradient, cable vibration, or whatever, an increased ambient water pressure would be felt in water chamber 108 forcing first piston member 86 forward and moving the connecting lever 98 such that the shafts 38 and 40 would be moved in a clockwise direction to change the angle of attack of diving planes 42 and 44 and thus maintain paravane 28 at the preset, desired depth. In the same manner, a raising up of paravane 28 will cause a decrease in water pressure, allowing first piston member 86 to move rearward to impart a neagtive angle to the diving planes 42 and 44 to depress paravane 28 downward to the desired operating depth. It should be noted too that an external condition such as temperature change is not necessarily momentary and that diving planes 42 and 44 may be positioned at canted attack angles for extended periods to maintain paravane 28 at the prescribed operating depth.

The remote control function is utilized to change the operating depth after the cable has been trailed out in the water. Such a function enables a great saving in survey time. For example, it is qutie often the case that after a certain sounding run on a first course leg it is desirable to change the receiving depth of the seismic detector cable 26 for an ensuing course leg. Since many thousands of yards of such seismic detector cable may be let out, it is very time-consuming to reel in the entire cable to set each paravane for the new depth. Thus, the present remote control function allows the cable operating depth to be set practically instantaneously with no equipment down time.

This is done simply by remotely controlling the bidirectional motor 144 (FIGS. 3 and 4) to move the second piston member 112 one way or the other along the threaded shaft 118 to change the applied force of tension spring 100 by a predetermined amount. Thus, by moving the second piston member 112 rearward and lessening the force exerted by tension spring 100 on first piston member 86, the paravane 28 will be enabled to operate at a deeper depth, since greater ambient water pressure will be required to counter the force of the air pressure and spring tension against the first piston member 86. Rotating the threaded shaft 118 such that the second piston member 112 is moved forward will have the opposite effect of decreasing the tension of spring 100 on first piston member 86 such that the paravane 28 will operate about a lesser depth. The actuation motor 144 has the effect of setting the "course" depth as was also effected by the manual adjustment of knob 148.

With reference to FIG. 4, the present example utilizes 200 and 300 cycle per second control frequencies as the $F_1$ and $F_2$ frequencies, respectively, for delivering elevation and diving commands to the paravane 28 (or a plurality of such paravanes). As previously stated, detection of the first energy burst of 200 cycles per second would energize resonant reed relay 160 to cause conduction of transistor 186 and energization of $R_1$ relay 192 such that $R_3$ relay 212 is energized to provide current flow in a first direction through motor 144. The attendant motor rotation through gear train 232 and 230 to shaft 118 would tend to displace the second piston member 112 (FIG. 4) forward in paravane 28 such that less water pressure is required in the countering force equation. This then causes paravane 28 to operate at a new, more shallow depth.

Similarly, receipt of a burst of energy at 300 cycles per second energizes resonant reed relay 162, transistor 202, and the associated $R_2$ relay 208 and $R_4$ relay 226 such that current flow is enabled in an opposite direction through motor 144, the gear train within gear box 148 is being reversed such that reversed rotation on shaft 118 moves the second piston member 112 (FIG. 3) rearward to increase the force of tension spring 100 and cause a diving tilt to be imparted to diving planes 42 and 44 until the paravane 28 reaches a new and deeper water pressure level, a new operating depth.

Whenever a signal is received by the detcetor 64, the motor 144 turns a given number of revolutions before it stops due to the holding action of microswitch 218 and the cam wheel 216. This in turn will cause the shaft 118 to drive the second piston member 112 a given increment each time the circuit is activated. It should be apparent too, that the increment size can be adjusted by either (a) variation of the turns ratio between motor shaft 142 and shaft 228 in gear box 138, or (b) by providing additional cut-out portions 220 about the outer circumference of cam wheel 216. When it is desired to adjust the operating depth of several paravanes from the remote position, the control function may be performed by either (a) assigning a different pair of resonant frequencies to each paravane control system so that each one can be individually adjusted, or (b) employing the same resonant frequencies for all paravane control systems so that the operating depths of all paravane units will change in response to either of two transmitted frequencies.

It should be understood that there are many possible variations for operating the control motor of the present system. There are various equivalent ways other than resonant relays which may be employed in detecting the separate control functions, e.g., tuned circuits, etc. In addition, various other methods may be utilized to transmit the signal to the controllers, such well-known control linkage practice being performed through acoustic conductors, electromagnetic coupling via the detector cable, direct coupling of an electric signal through the detector cable, etc.

The foregoing discloses a novel depth controlling system for use with seismic cable paravanes which enables one or more paravanes to be depth-adjusted while the surveying ship or system is under way, no delay being required before continuing on the next leg of a seismic survey course. The depth control system set forth herein is a highly reliable electro-mechanical device which may be contained within a paravane unit, and which may include its own power source in complete isolation from the detector cable. While enabling "coarse" control of the operating depth by means of a remote actuating system, the depth control system also provides a "fine" depth control which takes over to function automatically at each preset or remotely selected "coarse" depth.

Changes may be made in the combination and arrangement of elements as heretofore set forth in this specification and shown in the drawings; it being understood, that changes may be made in the embodiments disclosed without departing from the spirit and scope of the invention.

What is claimed is:

1. A pressure-responsive depth control system for use in a paravane having adjustable diving planes comprising:
   first enclosure means within said paravane containing air at a predetermined pressure;
   second enclosure means within said paravane receiving water from the surrounds of said paravane;
   a moveable partition means which is a common wall to both said first and second enclosures;
   spring means connected at one end to said partition means and extending its other end into said second enclosure means;
   means connected to said spring means other end and includes block means having a cross section similar to that of said second enclosure means and having an axial threaded bore, and being disposed for movement within said second enclosure means to provide predetermined spring tension upon said partition means;
   rolling diaphragm seal means disposed about said block means to provide a fluid-tight connection between said block means and said second enclosure; and
   actuator means connected to said partition means to provide movement to said driving planes in proportion to the movement of said partition means.

2. A depth control system as set forth in claim 1 which is further characterized to include;
   a threaded shaft which is moveable through said threaded bore; and
   drive means for imparting rotation to said threaded shaft of thereby vary the position of said block means, thus changing the spring tension which is placed upon said partition means.

3. A depth control system as set forth in claim 2 which is further characterized to include:
   a control means which is actuatable from a remote position to energize said drive means to impart predetermined rotation to said threaded shaft.

4. A depth control system as set forth in claim 3 wherein said control means comprises:
   first means responsive to a first control signal to energize said drive means to impart rotation to said shaft means in a first direction; and
   second means responsive to a second control signal to energize said drive means oppositely to impart opposite rotation to said threaded shaft means.

5. A depth control system as set forth in claim 4 which is further characterized to include:

transmitter means located remotely from said paravane and depth control system for controlling the generation of said first and second control signals.

6. A depth control system as set forth in claim 5 which is further characterized to include:

frequency selective means actuated in response to detection of first and second frequencies to generate said first and second control signals;

detector means responsive to supersonic energy to receive indications at said first and second frequency; and transmitter means situated at a remote location for sending out control pulses at said first or second frequencies.

References Cited
UNITED STATES PATENTS

| | | |
|---|---|---|
| 2,441,568 | 5/1948 | Finison. |
| 2,729,910 | 1/1956 | Fryklund _____ 114—235 X |
| 3,057,314 | 10/1962 | Elmer _____ 114—25 |

TRYGVE M. BLIX, *Primary Examiner.*

U.S. Cl. X.R.

114—25